United States Patent
Sei

(10) Patent No.: US 12,318,972 B2
(45) Date of Patent: Jun. 3, 2025

(54) DOUBLE-BELT PRESS

(71) Applicant: SGIC INC., Anan (JP)

(72) Inventor: Keisuke Sei, Anan (JP)

(73) Assignee: SGIC INC., Tokushima (JP)

( * ) Notice: Subject to any disclaimer, the term of this patent is extended or adjusted under 35 U.S.C. 154(b) by 0 days.

(21) Appl. No.: 17/922,503

(22) PCT Filed: Jun. 6, 2022

(86) PCT No.: PCT/JP2022/022787
§ 371 (c)(1),
(2) Date: Oct. 31, 2022

(87) PCT Pub. No.: WO2023/127179
PCT Pub. Date: Jul. 6, 2023

(65) Prior Publication Data
US 2024/0217146 A1    Jul. 4, 2024

(30) Foreign Application Priority Data
Dec. 28, 2021   (JP) ................ 2021-215217

(51) Int. Cl.
*B29C 43/48* (2006.01)
*B30B 5/06* (2006.01)

(52) U.S. Cl.
CPC .............. *B29C 43/48* (2013.01); *B30B 5/062* (2013.01); *B29C 2043/483* (2013.01)

(58) Field of Classification Search
CPC .. B30B 5/06; B30B 5/062; B30B 5/04; B29C 43/48; B29C 2043/483; B27D 3/04
See application file for complete search history.

(56) References Cited

U.S. PATENT DOCUMENTS

| 4,331,073 A | 5/1982 | Girola |
| 4,723,484 A | 2/1988 | Held |
| 5,980,368 A * | 11/1999 | Chang ............... B24B 37/16 |
| | | 451/303 |

FOREIGN PATENT DOCUMENTS

| JP | S6274611 A * | 4/1987 | ............. B29C 43/48 |
| JP | 63-56040 | 11/1988 | |

(Continued)

OTHER PUBLICATIONS

JPH03264196A English translation prepared May 20, 2024 (Year: 2024).*

(Continued)

*Primary Examiner* — Alison L Hindenlang
*Assistant Examiner* — Shibin Liang
(74) *Attorney, Agent, or Firm* — Wenderoth, Lind & Ponack, L.L.P.

(57) ABSTRACT

In a double-belt press, an inner seal has an inner seal flow passage having an intake port via which a sealing fluid supplied into an inner sealing groove is taken in and a jet port via which the sealing fluid taken in via the intake port jets toward belts. The outer seal has an outer seal flow passage having an intake port via which the sealing fluid supplied into an outer sealing groove is taken in and a jet port via which the sealing fluid taken in via the intake port jets toward the belts. The partition wall has a plurality of fluid supply passages that supply each of the inner sealing groove and the outer sealing groove with the sealing fluid and a plurality of fluid recovery passages that recover the sealing fluid accumulating in the space formed between the inner seal and the outer seal.

8 Claims, 7 Drawing Sheets

(56) References Cited

FOREIGN PATENT DOCUMENTS

| JP | 63-267525 | 11/1988 | | |
|----|-----------|---------|---|---|
| JP | 3-39811 | 6/1991 | | |
| JP | 3-264196 | 11/1991 | | |
| JP | H03264196 A | * 11/1991 | ............... | B20B 5/06 |

OTHER PUBLICATIONS

JPS6274611A English translation prepared May 20, 2024 (Year: 2024).*

* cited by examiner

DOUBLE-BELT PRESS

TECHNICAL FIELD

The present invention relates to a hydraulic double-belt press that forms a product in compression molding.

BACKGROUND ART

In a continuous pressure device described in Patent Literature 1, a sliding member is pressed against a conveyor belt to prevent a pressurizing fluid in a pressurizing chamber from leaking out. Furthermore, a sealing fluid is caused to flow out of a recess formed in a surface of the sliding member, the surface facing the conveyor belt, to form a fluidized layer of the sealing fluid between the sliding member and the conveyor belt. The fluidized layer prevents the pressurizing fluid in the pressurizing chamber from leaking out of the pressurizing chamber.

In Patent Literature 1, the pressurizing fluid in the pressurizing chamber is not allowed to leak out as described above. However, since it is unavoidable that the pressurizing fluid leaks from a gap between the sliding member and the conveyor belt, the continuous pressure device is configured to discharge the pressurizing fluid having leaked from the gap. Specifically, a sealing member is pressed against the conveyor belt to form a discharge space between the sealing member and the sliding member. The pressurizing fluid leaking into the discharge space is then discharged via a discharge hole.

CITATION LIST

Patent Literature

Patent Literature 1: Japanese Patent Laid-Open No. 3-264196

SUMMARY OF INVENTION

Technical Problem

In Patent Literature 1, in which the sealing member is pressed against the conveyor belt, movement of the conveyor belt can undesirably create a gap between the sealing member and the conveyor belt, and the fluid may undesirably leak through the gap. It is described in Patent Literature 1 that a plurality of sealing members are used to suppress the leakage of the fluid. This, however, may result in the number of parts increasing, and increase the size of the continuous pressure device.

Solution to Problem

The present invention relates to a double-belt press that applies pressure to a product by means of a pressurizing fluid contained in a pressurizing chamber while conveying the product sandwiched between a pair of belts. The double-belt press includes a sealer that is provided along the outer edge of the pressurizing chamber and seals the pressurizing chamber. The sealer includes an inner seal, an outer seal, and a partition wall.

The inner seal is contained in an inner sealing groove, and an inner seal flow passage having an intake port and a jet port formed at opposite ends thereof is formed in the inner seal. A sealing fluid supplied into the inner sealing groove is taken in via the intake port, and the sealing fluid taken in via the intake port jets out via the jet port toward belts.

The outer seal is contained in an outer sealing groove provided at a position farther from the pressurizing chamber than the inner sealing groove, and an outer seal flow passage having an intake port and a jet port formed at opposite ends thereof is formed in the outer seal. The sealing fluid supplied into the outer sealing groove is taken in via the intake port, and the sealing fluid taken in via the intake port jets out via the jet port toward the belts.

The partition wall is formed between the inner sealing groove and the outer sealing groove and has a plurality of fluid supply passages that supply each of the inner sealing groove and the outer sealing groove with the sealing fluid and a plurality of fluid recovery passages that recover the sealing fluid accumulating in the space formed between the inner seal and the outer seal. The plurality of fluid supply passages and the plurality of fluid recovery passages are provided in positions different from one another in a direction along the outer edge of the pressurizing chamber.

A deformable member for inner seal that is able to deform may be disposed between a bottom surface of the inner sealing groove and the inner seal, and a deformable member for outer seal that is able to deform may be disposed between a bottom surface of the outer sealing groove and the outer seal. The deformable member for inner seal biases the inner seal toward the belts when receiving a pressing force from the fluid supplied via the bottom surface of the inner sealing groove. The deformable member for outer seal biases the outer seal toward the belts when receiving a pressing force from the fluid supplied via the bottom surface of the outer sealing groove. The force that biases the inner seal toward the belts may be greater than the force that biases the outer seal toward the belts.

The fluid supply passages that supply the inner sealing groove with the sealing fluid may supply the sealing fluid in an inclining direction from a side surface of the partition wall, the side surface forming part of the inner sealing groove, toward the belts. Similarly, the fluid supply passages that supply the outer sealing groove with the sealing fluid may supply the sealing fluid in an inclining direction from a side surface of the partition wall, the side surface forming part of the outer sealing groove, toward the belts.

A wiper that is pressed against the surfaces of the belts may be provided at a position farther from the pressurizing chamber than the sealer along the outer edge of the pressurizing chamber. A recovery port via which the sealing fluid is recovered may be provided between the sealer and the wiper.

At least one of the inner seal and the outer seal may be formed of a first sub-seal and a second sub-seal connected to each other. The first sub-seal and the second sub-seal may be displaceable relative to each other in the direction in which the pair of belts sandwich the product. A plurality of sub-seals (first to N-th sub-seals, where N is a positive number greater than or equal to 2) may be provided.

Advantageous Effects of Invention

According to the present invention, in which the sealing fluid jets out of each of the inner seal and the outer seal toward the belts, layers of the sealing fluid can be formed between the inner seal and the belt and between the outer seal and the belt. The layers can suppress leakage of the pressurizing fluid contained in the pressurizing chamber from the sealer.

DESCRIPTION OF EMBODIMENT

Figure 1:
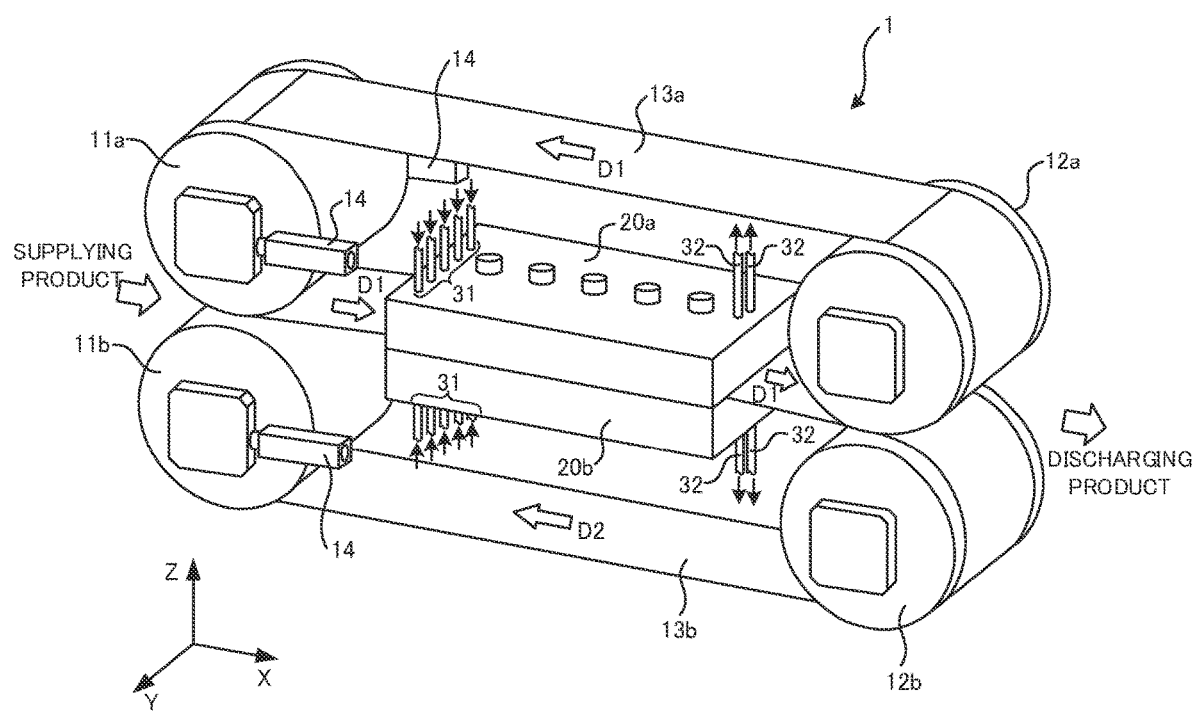
FIG. 1 is a perspective view showing an overview of a double-belt press.

FIG. 1 is a perspective view showing an overview of a double-belt press 1 according to a present embodiment. In FIG. 1, axes X, Y, and Z are perpendicular to one another, and in the present embodiment, the axis Z is the axis extending in the vertical direction.

A product that undergoes compression molding is supplied to the double-belt press 1 (space between a pair of belts 13a and 13b, which will be described later), undergoes compression molding in the double-belt press 1 (upper pressurizing unit 20a and lower pressurizing unit 20b, which will be described later) and is then discharged from the double-belt press 1, as shown in FIG. 1. Examples of the product may include metal-based composite materials, laminated products (copper clad laminate: CCL), fiber reinforced plastics (carbon fiber reinforced plastics: CFRP, and glass fiber reinforced plastics: GFRP), functional films, and a variety of boards.

The double-belt press 1 includes a pair of entrance pulleys 11a and 11b and a pair of exit pulleys 12a and 12b. An endless belt 13a engages with the entrance pulley 11a and the exit pulley 12a so as to extend therebetween, and an endless belt 13b engages with the entrance pulley 11b and the exit pulley 12b so as to extend therebetween. A cylinder 14 is connected to each of the entrance pulleys 11a and 11b, and the cylinders 14 can adjust the positions of the entrance pulleys 11a and 11b to adjust the tension of the belts 13a and 13b.

A power source (not shown) is connected to the exit pulley 12a, and the exit pulley 12a driven by the power from the power source can move the belt 13a in the direction indicated by the arrow D1. A power source (not shown) is connected to the exit pulley 12b, and the exit pulley 12b driven by the power from the power source can move the belt 13b in the direction indicated by the arrow D2. Rotary encoders (not shown) are connected to the entrance pulleys 11a and 11b, and the rotation of the exit pulleys 12a and 12b can be controlled based on the outputs from the rotary encoders.

An upper pressurizing unit 20a is disposed between the entrance pulley 11a and the exit pulley 12a, and the upper pressurizing unit 20a is in contact with the inner surface of the endless belt 13a. A lower pressurizing unit 20b is disposed between the entrance pulley 11b and the exit pulley 12b, and the lower pressurizing unit 20b is in contact with the inner surface of the endless belt 13b.

The upper pressurizing unit 20a and the lower pressurizing unit 20b sandwich the pair of belts 13a and 13b and exert a compressive force on the product located between the pair of belts 13a and 13b. Specifically, the product undergoes compression molding performed by the upper pressurizing unit 20a and the lower pressurizing unit 20b while being sandwiched between and conveyed by the pair of belts 13a and 13b. The product having undergone the compression molding is conveyed by the pair of belts 13a and 13b while being sandwiched therebetween, and then discharged from the double-belt press 1.

Oil supply tubes 31 and oil discharge tubes 32 are connected to each of the upper pressurizing unit 20a and lower pressurizing unit 20b. The oil supply tubes 31 supply each of the upper pressurizing unit 20a and the lower pressurizing unit 20b with oil, and the oil discharge tubes 32 recover and discharge the oil used in each of the upper pressurizing unit 20a and the lower pressurizing unit 20b.

The oil supply tubes 31 include oil supply tubes 31 that supply oil for applying pressure to the product (hereinafter referred to as "pressurizing oil Op"), oil supply tubes 31 that supply an inner sealing groove 41 and an outer sealing groove 42, which will be described later, with oil (hereinafter referred to as "sealing oil Os"), and oil supply tubes 31 that supply oil for biasing an inner seal 60a and an outer seal 60b, which will be described later, (hereinafter referred to as "biasing oil Ob"). The oil discharge tubes 32 include oil discharge tubes 32 that discharge the sealing oil Os recovered via oil recovery ports 43e, which will be described later, (oil Os1 for inner seal and oil Os2 for outer seal, which will be described later), and oil discharge tubes 32 that discharge the sealing oil Os recovered via an oil recovery port 44, which will be described later, (oil Os1 for inner seal and oil Os2 for outer seal, which will be described later).

In the present embodiment, oil is supplied to each of the upper pressurizing unit 20a and lower pressurizing unit 20b, but not necessarily. That is, a fluid other than oil can be used to operate the double-belt press 1.

Figure 2:
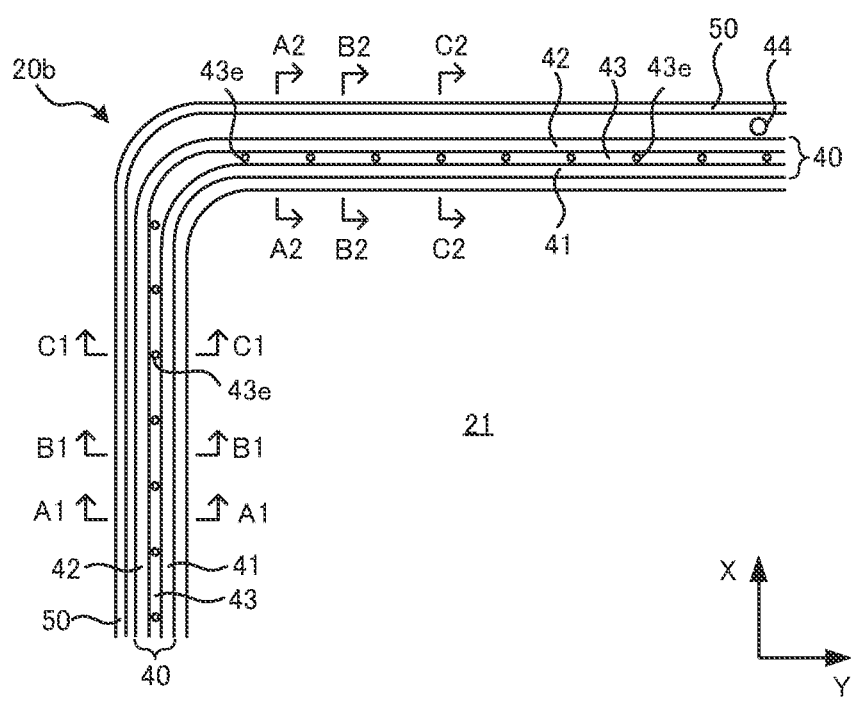
FIG. 2 is a schematic plan view showing part of a surface in contact with a belt in a lower pressurizing unit.
Figure 3:
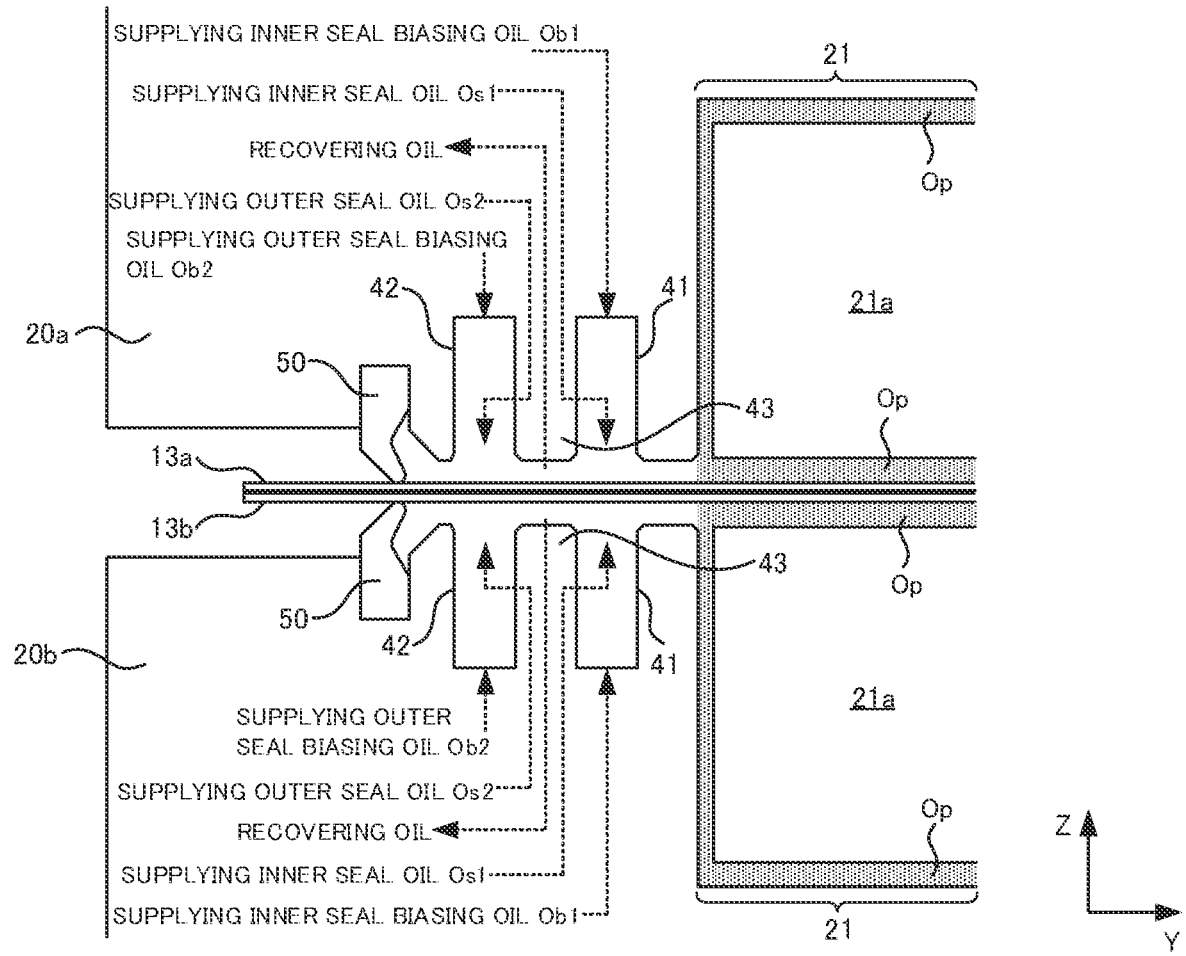
FIG. 3 is a cross-sectional view of part of an upper pressurizing unit and the lower pressurizing unit.

FIG. 2 is a schematic view of part of the lower pressurizing unit 20b viewed from the side facing the belt 13b (that is, upper side in FIG. 1). FIG. 3 is a vertical cross-sectional view (cross-sectional view taken along plane Y-Z) showing part of structures of the upper pressurizing unit 20a and lower pressurizing unit 20b. Note that the upper pressurizing unit 20a and the lower pressurizing unit 20b have the same structure and are arranged in vertical symmetry. In FIGS. 2 and 3, the inner seal 60a, the outer seal 60b, and other components described later (see FIGS. 4 to 6) are omitted.

The lower pressurizing unit 20b includes a pressurizing chamber 21, in which a compressive force is exerted on the product via the belt 13b, as shown in FIG. 2. The pressurizing chamber 21 contains a heater 21a and the pressurizing oil Op, as shown in FIG. 3. The pressurizing oil Op contained in the pressurizing chamber 21 of the upper pressurizing unit 20a is in contact with the upper surface of the belt 13a, and is used to exert a compressive force on the product via the belt 13a. The pressurizing oil Op contained in the pressurizing chamber 21 of the lower pressurizing unit 20b is in contact with the lower surface of the belt 13b, and is used to exert a compressive force on the product via the belt 13b. The heaters 21a are used to heat the pressurizing oil Op contained in the pressurizing chambers 21. The product is thus heated when undergoing the compression molding.

The outer edge of each of the pressurizing chambers 21 is provided with a sealer 40 and a wiper 50, as shown in FIG. 2. The sealer 40 and the wiper 50 each have a rectangular shape formed along the outer edge (outer perimeter) of the pressurizing chamber 21 in the plane X-Y and prevent the pressurizing oil Op used in the pressurizing chamber 21 from leaking out of the upper pressurizing unit 20a and/or lower pressurizing unit 20b. The wiper 50 is provided at a position farther from the pressurizing chamber 21 than the sealer 40. The wiper 50 can be made, for example, of metal or resin. The oil recovery port 44, which is provided between the sealer 40 and the wiper 50, is used to recover the sealing oil Os (oil Os1 for inner seal and oil Os2 for outer seal, which will be described later) and other types of oil when leaking from the sealer 40.

The sealer 40 includes an inner sealing groove 41 and an outer sealing groove 42, and the inner sealing groove 41 and the outer sealing groove 42 each have a rectangular shape formed along the outer edge of the pressurizing chamber 21 in the plane X-Y. The inner sealing groove 41 is provided at a position closer to the pressurizing chamber 21 than the outer sealing groove 42, and the outer sealing groove 42 is provided at a position farther from the pressurizing chamber 21 than the inner sealing groove 41. A partition wall 43 is provided between the inner sealing groove 41 and the outer sealing groove 42. The partition wall 43 has two sidewall surfaces, one sidewall surface forming part of the inner sealing groove 41, and the other sidewall surface forming part of the outer sealing groove 42.

The sealing oil Os (oil Os1 for inner seal and oil Os2 for outer seal) is supplied to the inner sealing groove 41 and the outer sealing groove 42 via the partition wall 43, and the sealing oil Os supplied to the inner sealing groove 41 and the outer sealing groove 42 is recovered via the partition wall 43. The structure that supplies the sealing oil Os to the inner sealing groove 41 and the outer sealing groove 42, and the structure that recovers the sealing oil Os will be described later.

The tips of the wipers 50 are pressed against the surfaces of the belts 13a and 13b to prevent the oil (primarily sealing oil Os) from leaking out of the upper pressurizing unit 20a and the lower pressurizing unit 20b along the surfaces of the belts 13a and 13b, as shown in FIG. 3.

Figure 4:
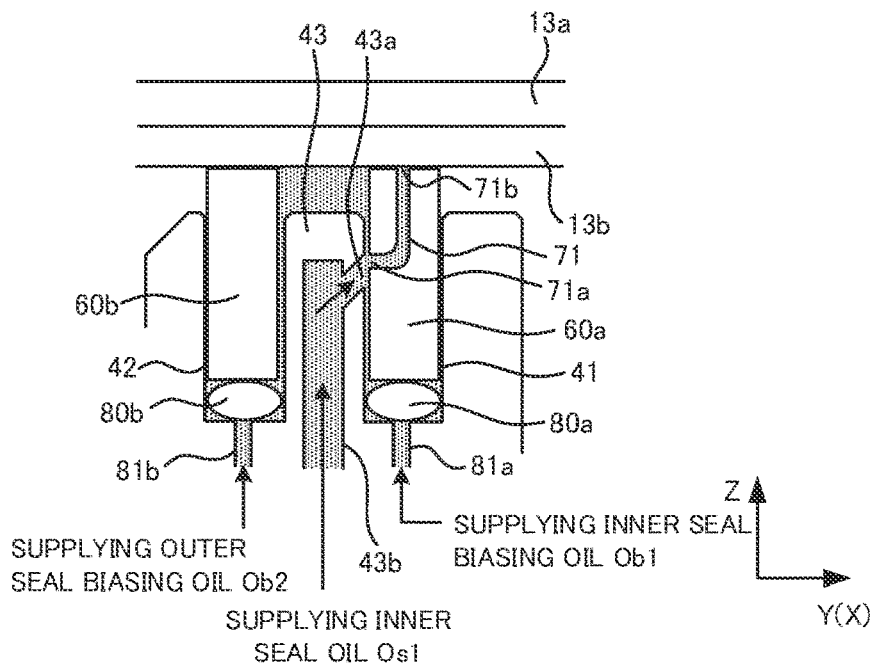
FIG. 4 is a cross-sectional view taken along the line A1-A1 or A2-A2 in FIG. 2.

FIG. 4 is a schematic view showing the cross section taken along the line A1-A1 or A2-A2 in FIG. 2 and shows the structure that supplies the inner sealing groove 41 with the oil Os1 for inner seal. The inner seal 60a and a deformable member 80a for inner seal are disposed in the inner sealing groove 41, and the outer seal 60b and a deformable member 80b for outer seal are disposed in the outer sealing groove 42, as shown in FIG. 4. The inner seal 60a and the deformable member 80a for inner seal are disposed along the inner sealing groove 41 and each have a rectangular shape in the plane X-Y. The outer seal 60b and the deformable member 80b for outer seal are disposed along the outer sealing groove 42 and each have a rectangular shape in the plane X-Y.

The inner seal 60a and the outer seal 60b can be made of metal, such as iron or an alloy. The deformable member 80a for inner seal is disposed at the bottom surface of the inner sealing groove 41, and the deformable member 80b for outer seal is disposed at the bottom surface of the outer sealing groove 42. The deformable member 80a for inner seal and the deformable member 80b for outer seal can each be formed of an elastically deformable member, for example, an O-ring. The deformable member 80a for inner seal is disposed between the bottom surface of the inner sealing groove 41 and the inner seal 60a, and is in contact with the bottom surface of the inner sealing groove 41 and the inner seal 60a. The deformable member 80b for outer seal is disposed between the bottom surface of the outer sealing groove 42 and the outer seal 60b, and is in contact with the bottom surface of the outer sealing groove 42 and the outer seal 60b.

An oil supply passage 81a is connected to the bottom surface of the inner sealing groove 41, and inner seal biasing oil Ob1 is supplied from the oil supply passage 81a toward the inner sealing groove 41. At the bottom surface of the inner sealing groove 41, the oil supply passage 81a remains blocked by the deformable member 80a for inner seal, and the inner seal biasing oil Ob1 supplied from the oil supply passage 81a toward the inner sealing groove 41 produces, via the deformable member 80a for inner seal, a force that presses the inner seal 60a against the belt 13b (hereinafter referred to as "pressing force F1"). In this process, the deformable member 80a for inner seal is elastically deformed to allow the inner seal 60a to move in the inner sealing groove 41.

An oil supply passage 81b is connected to the bottom surface of the outer sealing groove 42, and outer seal biasing oil Ob2 is supplied from the oil supply passage 81b toward the outer sealing groove 42. At the bottom surface of the outer sealing groove 42, the oil supply passage 81b remains blocked by the deformable member 80b for outer seal, and the outer seal biasing oil Ob2 supplied from the oil supply passage 81b toward the outer sealing groove 42 produces, via the deformable member 80b for outer seal, a force that presses the outer seal 60b against the belt 13b (hereinafter referred to as "pressing force F2"). In this process, the deformable member 80b for outer seal is elastically deformed to allow the outer seal 60b to move in the outer sealing groove 42.

The pressing force F1 described above can be greater than the pressing force F2. The inner seals 60a are thus readily pressed against the belts 13a and 13b to prevent the pressurizing oil Op contained in the pressurizing chambers 21 from leaking from the spaces between the inner seal 60a and the belts 13a, 13b.

An inner oil supply port 43a, via which the oil Os1 for inner seal is supplied toward the inner sealing groove 41, is formed at a sidewall surface of the partition wall 43, the sidewall surface forming part of the inner sealing groove 41. An oil supply passage 43b formed in the partition wall 43 is connected to the inner oil supply port 43a. The oil supply passage 43b is connected to the oil supply tubes 31 described above (oil supply tubes 31 that supply sealing oil Os).

The oil Os1 for inner seal supplied via the inner oil supply port 43a into the inner sealing groove 41 primarily accumulates in the inner sealing groove 41, accumulates in the space formed between the tip of the partition wall 43 and the belt 13b (or belt 13a), or flows into an inner seal oil flow passage 71, which will be described later, as shown in FIG. 4. The oil supply passage 43b supplies the oil Os1 for inner seal in an inclining direction from the inner oil supply port 43a toward the belt 13b (obliquely upward and rightward direction in FIG. 4). The thus configured oil supply passage 43b allows the oil Os1 for inner seal to be smoothly supplied via the inner oil supply port 43a toward the inner sealing groove 41.

The inner seal oil flow passage 71, along which the oil Os1 for inner seal is caused to flow, is formed in the inner seal 60a. An oil intake port 71a is formed at one end of the inner seal oil flow passage 71, and an oil jet port 71b is formed at the other end of the inner seal oil flow passage 71.

The oil intake port 71*a* faces a sidewall surface of the partition wall 43, the sidewall surface where the inner oil supply port 43*a* is formed, and the oil Os1 for inner seal supplied via the inner oil supply port 43*a* into the inner sealing groove 41 is taken into the inner seal oil flow passage 71 via the oil intake port 71*a*. The oil Os1 for inner seal having passed through the inner seal oil flow passage 71 jets out via the oil jet port 71*b* toward the belt 13*b* (or belt 13*a*). A layer of the oil Os1 for inner seal is thus formed between the inner seal 60*a* and the belt 13*b* (or belt 13*a*), and the layer can prevent the pressurizing oil Op in the pressurizing chamber 21 from leaking out.

The inner seal 60*a* has a plurality of inner seal oil flow passages 71 (oil intake ports 71*a* and oil jet ports 71*b*) formed at a plurality of positions different from one another. Similarly, a plurality of oil supply passages 43*b* are formed in the partition wall 43 at a plurality of positions different from each other. Forming the oil jet ports 71*b* at a plurality of positions in the inner seal 60*a* as described above allows formation of a layer of the oil Os1 for inner seal over the entire surface of the inner seal 60*a* facing the belt 13*b* (or belt 13*a*).

Figure 5:
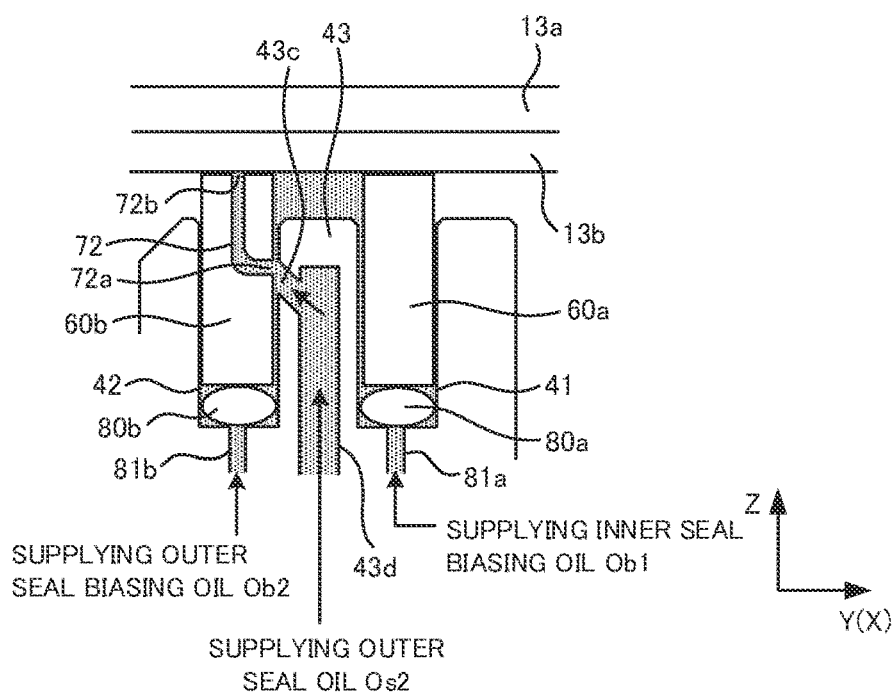
FIG. 5 is a cross-sectional view taken along the line B1-B1 or B2-B2 in FIG. 2.

FIG. 5 is a schematic view showing the cross section taken along the line B1-B1 or B2-B2 in FIG. 2 and primarily shows the structure that supplies the outer sealing groove 42 with the oil Os2 for outer seal. An outer oil supply port 43*c*, via which the oil Os2 for outer seal is supplied toward the outer sealing groove 42, is formed at a sidewall surface of the partition wall 43, the sidewall surface forming part of the outer sealing groove 42, as shown in FIG. 5. An oil supply passage 43*d* formed in the partition wall 43 is connected to the outer oil supply port 43*c*. The oil supply passage 43*d* is connected to the oil supply tubes 31 described above (oil supply tubes 31 that supply oil Os2 for outer seal).

The oil Os for outer seal supplied via the outer oil supply port 43*c* into the outer sealing groove 42 primarily accumulates in the outer sealing groove 42, accumulates in the space formed between the tip of the partition wall 43 and the belt 13*b* (or belt 13*a*), or flows into an outer seal oil flow passage 72, which will be described later, as shown in FIG. 5. The oil supply passage 43*d* supplies the oil Os2 for outer seal in an inclining direction from the outer oil supply port 43*c* toward the belt 13*b* (obliquely upward and leftward direction in FIG. 5). The thus configured oil supply passage 43*d* allows the oil Os2 for outer seal to be smoothly supplied via the outer oil supply port 43*c* toward the outer sealing groove 42.

The outer seal oil flow passage 72, along which the oil Os2 for outer seal is caused to flow, is formed in the outer seal 60*b*. An oil intake port 72*a* is formed at one end of the outer seal oil flow passage 72, and an oil jet port 72*b* is formed at the other end of the outer seal oil flow passage 72. The oil intake port 72*a* faces a sidewall surface of the partition wall 43, the sidewall surface where the outer oil supply port 43*c* is formed, and the oil Os2 for outer seal supplied via the outer oil supply port 43*c* into the outer sealing groove 42 is taken into the outer seal oil flow passage 72 via the oil intake port 72*a*. The oil Os2 for the outer seal having passed through the outer seal oil flow passage 72 jets out via the oil jet port 72*b* toward the belt 13*b* (or belt 13*a*). A layer of the oil Os2 for outer seal is thus formed between the outer seal 60*b* and the belt 13*b* (or belt 13*a*), and the layer can prevent the pressurizing oil Op in the pressurizing chamber 21 from leaking out.

The outer seal 60*b* has a plurality of outer seal oil flow passages 72 (oil intake ports 72*a* and oil jet ports 72*b*) formed at a plurality of positions different from one another. Similarly, a plurality of oil supply passages 43*d* are formed in the partition wall 43 at a plurality of positions different from each other. Forming the oil jet ports 72*b* at a plurality of positions in the outer seal 60*b* as described above allows formation of a layer of the oil Os2 for outer seal over the entire surface of the outer seal 60*b* facing the belt 13*b* (or belt 13*a*).

Figure 6:
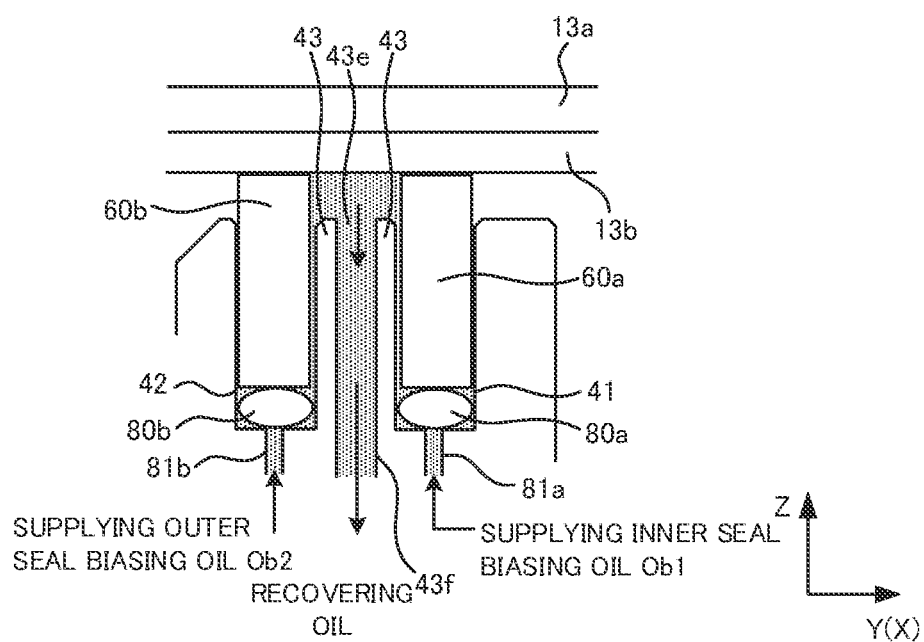
FIG. 6 is a cross-sectional view taken along the line C1-C1 or C2-C2 in FIG. 2.

FIG. 6 is a schematic view showing the cross section taken along the line C1-C1 or C2-C2 in FIG. 2, and primarily shows the structure that recovers the oil Os1 for inner seal supplied into the inner sealing groove 41 and the oil Os2 for outer seal supplied into the outer sealing groove 42. An oil recovery port 43*e*, via which the oil Os1 for inner seal and the oil Os2 for outer seal are recovered, is formed at a tip of the partition wall 43, the tip facing the belt 13*b*, as shown in FIG. 6. The oil recovery port 43*e* recovers the oil Os1 for inner seal and the oil Os2 for outer seal having accumulated in the space formed between the inner seal 60*a* and the outer seal 60*b*. An oil recovery passage 43*f* connected to the oil recovery port 43*e* is formed in the partition wall 43. The oil having flowed into the oil recovery passage 43*f* via the oil recovery port 43*e* is guided to the oil discharge tubes 32 described above (see FIG. 1).

Figure 7:
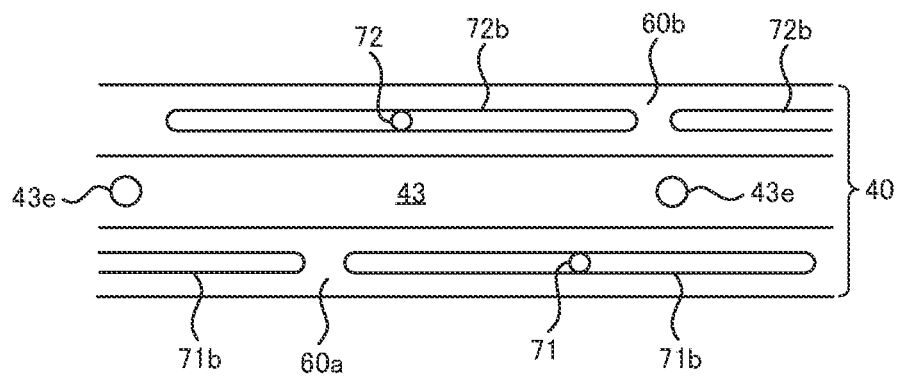
FIG. 7 shows the shape of oil jet ports in an inner and outer seals.

FIG. 7 shows the sealer 40 viewed from the side facing the belt 13*a* or 13*b*. FIG. 7 shows the inner seal 60*a* disposed in the inner sealing groove 41, and the outer seal 60*b* disposed in the outer sealing groove 42.

The oil jet ports 71*b* formed in the inner seal 60*a* extend in the longitudinal direction of the inner seal 60*a*, as shown in FIG. 7, and the oil Os1 for inner seal jetting out via the oil jet ports 71*b* forms a layer between the inner seal 60*a* and the belts 13*a*, 13*b*. The inner seal 60*a* has a rectangular shape formed along the outer edge of the pressurizing chamber 21 in the plane X-Y, and is formed of portions extending in the direction X and portions extending in the direction Y. In the portions extending in the direction X, the oil jet ports 71*b* extend in the direction X, and in the portions extending in the direction Y, the oil jet ports 71*b* extend in the direction Y.

The oil jet ports 72*b* formed in the outer seal 60*b* extend in the longitudinal direction of the outer seal 60*b*, as shown in FIG. 7, and the oil Os2 for outer seal jetting out via the oil jet ports 72*b* forms a layer between the outer seal 60*b* and the belts 13*a*, 13*b*. The outer seal 60*b* has a rectangular shape formed along the outer edge of the pressurizing chamber 21 in the plane X-Y, and is formed of portions extending in the direction X and portions extending in the direction Y. In the portions extending in the direction X, the oil jet ports 72*b* extend in the direction X, and in the portions extending in the direction Y, the oil jet ports 72*b* extend in the direction Y.

As described with reference to FIG. 2 and FIGS. 4 to 6, the inner oil supply ports 43*a*, the outer oil supply ports 43*c*, and the oil recovery ports 43*e* are provided in the partition wall 43 at positions different from one another. The total number of inner oil supply ports 43*a*, the total number of outer oil supply ports 43*c*, and the total number of oil recovery ports 43*e* can be determined as appropriate. The total number of inner oil supply ports 43*a* can be greater than the total number of outer oil supply ports 43*c*.

Figure 8:
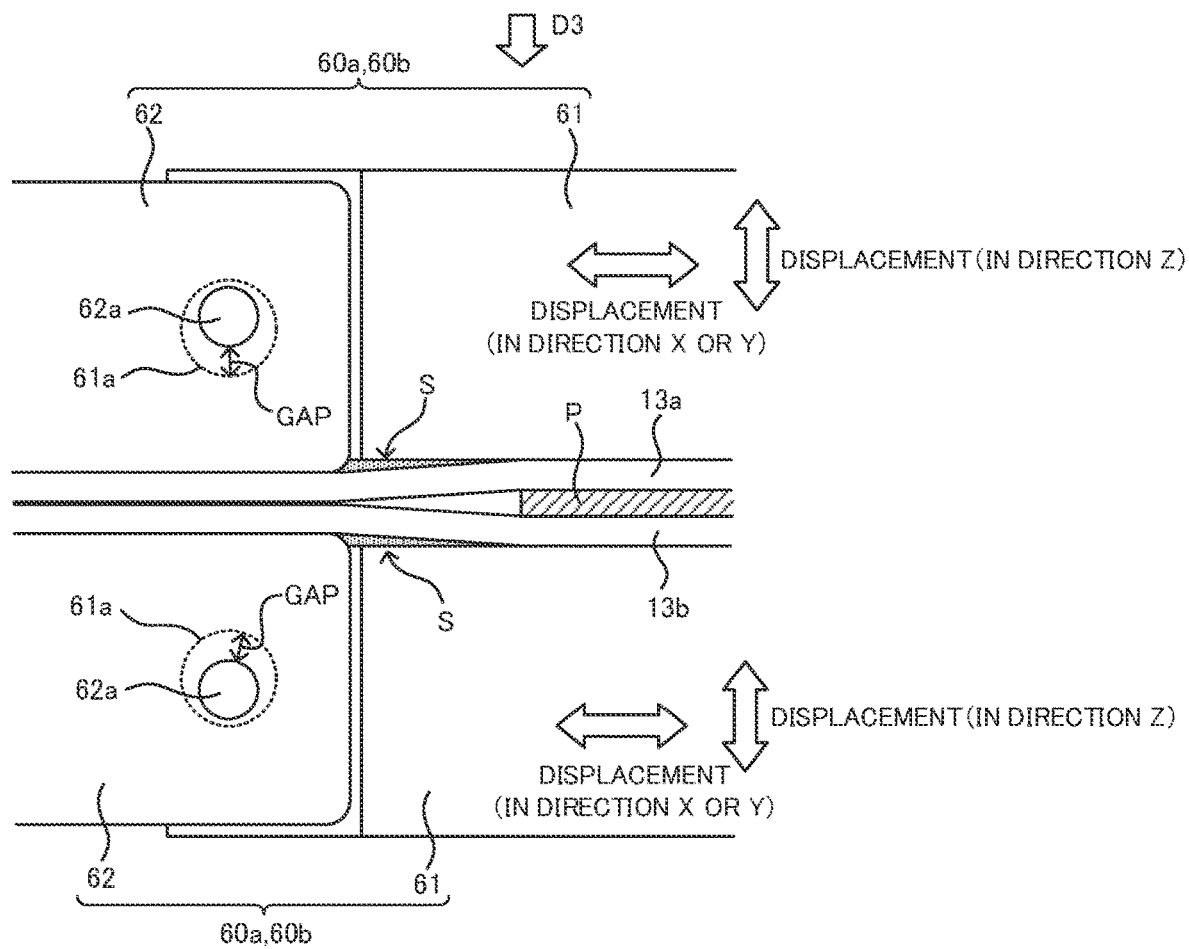
FIG. 8 is a schematic view showing the structures of the inner seal or the outer seal.
Figure 9:
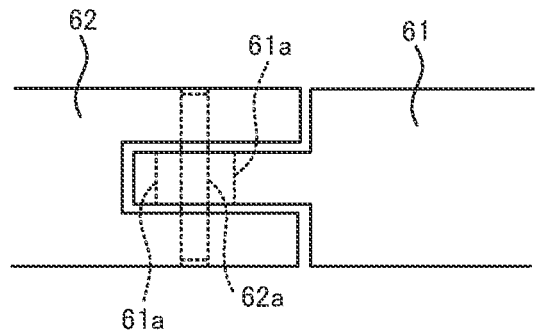
FIG. 9 is a schematic view of a first sub-seal and a second sub-seal viewed in a direction Z.

The inner seal 60*a* and the outer seal 60*b* can each be formed of a single member (seal) or can be formed of a plurality of members (sub-seals). FIG. 8 shows an example in which the inner seal 60*a* and the outer seal 60*b* are each formed of two members (first sub-seal 61 and second sub-seal 62). At least one of the inner seal 60*a* and the outer seal 60*b* can be formed of two members (first sub-seal 61 and second sub-seal 62). FIG. 9 is a schematic view of the first sub-seals 61 and the second sub-seals 62 viewed in the direction indicated by the arrow D3 (in the direction Z) in FIG. 8.

In FIGS. 8 and 9, one of the first sub-seals 61 and the corresponding second sub-seal 62 are connected to each other to form the inner seal 60*a* or the outer seal 60*b*. Specifically, an opening 61*a* is formed in each of the first sub-seals 61, and a pin 62*a* passes through the opening 61*a* with the opposite ends of the pin 62*a* fixed to the second sub-seal 62. A gap is formed between the outer circumferential surface of the pin 62*a* and the inner circumferential surface of the opening 61*a*, and the pin 62*a* is movable in the space formed in the opening 61*a*. The outer diameter of the opening 61*a* is greater than the outer diameter of the pin 62*a*.

Figure 10:
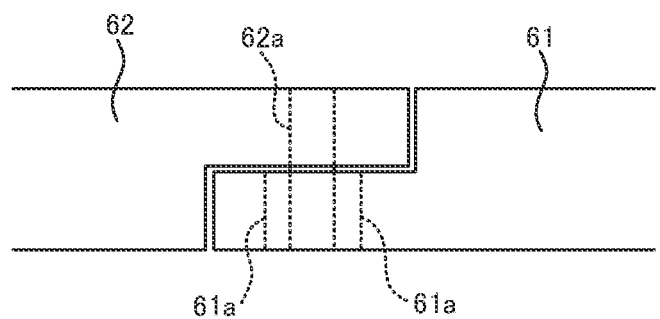
FIG. 10 is a schematic view of the first sub-seal and the second sub-seal viewed in the direction Z (variation).

The structure shown in FIG. 9 can be replaced with the structure shown in FIG. 10. In the structure shown in FIG. 10, an end portion of the first sub-seal 61 and an end portion of the second sub-seal 62 are layered on each other, and the pin 62*a* passes through the end portion of the first sub-seal 61 and the end portion of the second sub-seal 62. An opening 61*a* is formed in the end portion of the first sub-seal 61, and the pin 62*a* is located in the opening 61*a*. Also in the structure shown in FIG. 10, a gap is formed between the outer circumferential surface of the pin 62*a* and the inner circumferential surface of the opening 61*a*, and the pin 62*a* is movable in the space formed in the opening 61*a*, as in the structure shown in FIG. 9.

The gap formed between the pin 62*a* and the opening 61*a* allows the first sub-seal 61 and the second sub-seal 62 to be displaced relative to each other in the direction Z and further displaced relative to each other in the direction X or Y. This can therefore reduce a dead space S formed between the inner seal 60*a* (or outer seal 60*b*) and the belt 13*a* located on the upper side, and a dead space S formed between the inner seal 60*a* (or outer seal 60*b*) and the belt 13*b* located on the lower side, as shown in FIG. 8, whereby leakage of the sealing oil Os (oil Os1 for inner seal and oil Os2 for outer seal) from the dead spaces S can be suppressed. A specific description follows.

In the example shown in FIG. 8, a product P sandwiched between the pair of belts 13*a* and 13*b* moves in the space between a pair of first sub-seals 61 disposed above and below. A plurality of kinds of product P having different thicknesses (length in the direction Z) may be used as the product P. A change in the thickness of the product P therefore results in a change in the state of the deformation of the belts 13*a* and 13*b* (see FIG. 8) that sandwich the product P.

When the first sub-seal 61 and the corresponding second sub-seal 62 are integrated with each other into a unit, a pair of the integrated units is unlikely to follow the deformation of the belts 13*a* and 13*b* that sandwich the product P. The thicker the product P is, the larger the dead spaces S tend to be, resulting in that the sealing oil Os (oil Os1 for inner seal and oil Os2 for outer seal) may undesirably leak from the dead spaces S.

On the other hand, in a structure in which the first sub-seal 61 and the corresponding second sub-seal 62 are displaced relative to each other, each set of the first sub-seal 61 and the corresponding second sub-seal 62 can follow the deformation of each of the belts 13*a* and 13*b* that sandwich the product P, whereby an increase in the dead spaces S can be suppressed. For example, when the thickness of the product P increases, the first sub-seals 61 are displaced relative to the second sub-seals 62 in the direction away from the product P (upward and/or downward in FIG. 7), while the second sub-seals 62 remain close to the belts 13*a* and 13*b*. An increase in the dead spaces S can therefore be suppressed, whereby the leakage of the sealing oil Os (oil Os1 for inner seal and oil Os2 for outer seal) due to an increase in the dead spaces S can be suppressed.

When the product P sandwiched between the belts 13*a* and 13*b* is conveyed in the direction perpendicular to the plane of view of FIG. 8, the portion where each of the first sub-seals 61 and the corresponding second sub-seal 62 are connected to each other can be provided at a position corresponding to the widthwise end portion of the product P (in the direction Y shown in FIG. 1). The inner seal 60*a* (or outer seal 60*b*) has a rectangular shape in the plane X-Y, and is therefore formed of the portions extending in the direction X and the portions extending in the direction Y, as described above. The portion where each of the first sub-seals 61 and the corresponding second sub-seal 62 are connected to each other can therefore be provided in a portion extending in the direction Y out of the inner seal 60*a* (or outer seal 60*b*).

The portion where each of the first sub-seals 61 and the corresponding second sub-seal 62 are connected to each other can be provided at the position corresponding to at least one of the widthwise opposite end portions of the product P. When a plurality of kinds of product P having widths different from one another are used, the portion where each of the first sub-seals 61 and the corresponding second sub-seal 62 are connected to each other can be provided at a plurality of locations in correspondence with the widths of the plurality of kinds of product P. That is, the portion where each of the first sub-seals 61 and the corresponding second sub-seal 62 are connected to each other can be provided at a plurality of locations in a portion extending in the direction Y out of the inner seal 60*a* (or outer seal 60*b*). When the portion where each of the first sub-seals 61 and the corresponding second sub-seal 62 are connected to each other is provided at a plurality of locations, the inner seal 60*a* (or outer seal 60*b*) is, of course, formed of three or more sub-seals.

When the product P sandwiched between the belts 13*a* and 13*b* is conveyed rightward or leftward in FIG. 8, the portion where each of the first sub-seals 61 and the corresponding second sub-seal 62 are connected to each other can be provided at any position in the direction in which the product P is conveyed (in the direction X shown in FIG. 1). That is, the portion where each of the first sub-seals 61 and the corresponding second sub-seal 62 are connected to each other can be provided at a single location or a plurality of locations in a position extending in the direction X out of the inner seal 60*a* (or outer seal 60*b*). Even in this case, an increase in the dead spaces S can be suppressed when the belts 13*a* and 13*b* are conveying the product P.

In the example shown in FIG. 8, the inner seal 60*a* (or outer seal 60*b*) located above the belt 13*a* and the inner seal 60*a* (or outer seal 60*b*) located below the belt 13*b* are each formed of the first sub-seal 61 and the second sub-seal 62, but not necessarily. Specifically, only the inner seal 60*a* (or outer seal 60*b*) located above the belt 13*a* can be formed of the first sub-seal 61 and the second sub-seal 62, or only the inner seal 60*a* (or outer seal 60*b*) located below the belt 13*b* can be formed of the first sub-seal 61 and the second sub-seal 62.

In the present embodiment, the first sub-seal 61 is displaced in the direction Z relative to the second sub-seal 62 or displaced in the direction X or Y, but not necessarily. In consideration of the thickness of the product P described above, the first sub-seal 61 only needs to be displaced relative to the second sub-seal 62 in the direction Z. In this case, an elongated hole extending in the direction Z can be used as the opening 62a, and the pin 61a can be guided in the direction Z along the elongated hole.

In the present embodiment, the pin 62a and the opening 61a are used to cause the first sub-seal 61 and the second sub-seal 62 to be displaced relative to each other, but not necessarily. As described above, since the first sub-seal 61 and the second sub-seal 62 need only to be displaced relative to each other, any other structure that allows relative displacement of the two sub-seals can be used.

REFERENCE SIGNS LIST

1: Double-belt press, 13a, 13b: Belt, 21: Pressurizing chamber, 40: Sealer, 41: Inner sealing groove, 42: Outer sealing groove, 43: Partition wall, 43b, 43d: Oil supply passage, 43e: Oil recovery port, 43f: Oil recovery passage, 50: Wiper, 60a: Inner seal, 60b: Outer seal, 61: First sub-seal, 62: Second sub-seal, 80a: Deformable member for inner seal, 80b: Deformable member for outer seal, P: Product, Op: Pressuring oil, Os: Sealing oil, Os1: Oil for inner seal, Os2: Oil for outer seal, Ob: Biasing oil, Ob1: Inner seal biasing oil, Ob2: Outer seal biasing oil

The invention claimed is:

1. A double-belt press that applies pressure to a product by means of a pressurizing fluid contained in a pressurizing chamber while conveying the product sandwiched between a pair of belts, the double-belt press comprising:
   a sealer that extends along a length direction of the pressurizing chamber and a width direction of the pressurizing chamber so as to be provided around an outer perimeter of the pressurizing chamber and seals the pressurizing chamber,
   wherein the sealer includes
   an inner seal that is contained in an inner sealing groove and accommodates an inner seal flow passage having a first intake port via which a sealing fluid supplied into the inner sealing groove is taken in and a first jet port via which the sealing fluid taken in via the first intake port jets toward the belts, the first intake port and the first jet port being formed at opposite ends of the inner seal flow passage,
   an outer seal that is contained in an outer sealing groove provided at a position farther from the pressurizing chamber than the inner sealing groove and accommodates an outer seal flow passage having a second intake port via which the sealing fluid supplied into the outer sealing groove is taken in and a second jet port via which the sealing fluid taken in via the second intake port jets toward the belts, the second intake port and the second jet port being formed at opposite ends of the outer seal flow passage, and
   a partition wall that is formed between the inner sealing groove and the outer sealing groove and has
      a plurality of first fluid supply passages that extend toward the inner sealing groove and supply the inner sealing groove with the sealing fluid,
      a plurality of second fluid supply passages that extend toward the outer sealing groove and supply the outer sealing groove with the sealing fluid, and
      a plurality of fluid recovery passages that recover the sealing fluid accumulating in a space formed between the inner seal and the outer seal,
   wherein for portions of the sealer which extend along the length direction of the pressurizing chamber, each of the first fluid supply passages, the second fluid supply passages and the fluid recovery passages are arranged at different positions from one another with respect to the length direction of the pressurizing chamber, and
   for portions of the sealer which extend along the width direction of the pressurizing chamber each of the first fluid supply passages, the second fluid supply passages and the fluid recovery passages are arranged at different positions from one another with respect to the width direction of the pressurizing chamber.

2. The double-belt press according to claim 1, further comprising:
   a first deformable member that is disposed between a bottom surface of the inner sealing groove and the inner seal and is able to deform; and
   a second deformable member that is disposed between a bottom surface of the outer sealing groove and the outer seal and is able to deform,
   wherein the first deformable member biases the inner seal toward the belts when receiving a pressing force from the fluid supplied via the bottom surface of the inner sealing groove,
   the second deformable member biases the outer seal toward the belts when receiving a pressing force from the fluid supplied via the bottom surface of the outer sealing groove, and
   a force that biases the inner seal toward the belts is greater than a force that biases the outer seal toward the belts.

3. The double-belt press according to claim 1, wherein the first fluid supply passages that supply the sealing fluid into the inner sealing groove supply the sealing fluid in a sloping direction from a first side surface of the partition wall toward the belts, the first side surface forming part of the inner sealing groove.

4. The double-belt press according to claim 1, further comprising a wiper that is provided at a position farther from the pressurizing chamber than the sealer along the outer perimeter of the pressurizing chamber, the wiper being pressed against surfaces of the belts.

5. The double-belt press according to claim 4, wherein a recovery port via which the sealing fluid is recovered is provided between the sealer and the wiper.

6. The double-belt press according to claim 1,
   wherein at least one of the inner seal and the outer seal is formed of a first sub-seal and a second sub-seal connected to each other, and
   the first sub-seal and the second sub-seal are displaceable in a direction in which the pair of belts sandwich the product.

7. The double-belt press according to claim 3, wherein the second fluid supply passages that supply the sealing fluid into the outer sealing groove supply the sealing fluid in a sloping direction from a second side surface of the partition wall toward the belts, the second side surface forming part of the outer sealing groove.

8. The double-belt press according to claim 1, wherein the second fluid supply passages that supply the sealing fluid into the outer sealing groove supply the sealing fluid in a sloping direction from a side surface of the partition wall toward the belts, the side surface forming part of the outer sealing groove.

* * * * *